(12) United States Patent
Yeh

(10) Patent No.: US 11,341,249 B2
(45) Date of Patent: May 24, 2022

(54) FIRMWARE SECURITY GUARDING METHOD AND ELECTRONIC SYSTEM USING THE SAME

(71) Applicant: Wiwynn Corporation, New Taipei (TW)

(72) Inventor: Chung-Chieh Yeh, New Taipei (TW)

(73) Assignee: Wiwynn Corporation, New Taipei (TW)

(*) Notice: Subject to any disclaimer, the term of this patent is extended or adjusted under 35 U.S.C. 154(b) by 247 days.

(21) Appl. No.: 16/372,441

(22) Filed: Apr. 2, 2019

(65) Prior Publication Data

US 2020/0226262 A1 Jul. 16, 2020

(30) Foreign Application Priority Data

Jan. 15, 2019 (TW) ................. 108101443

(51) Int. Cl.
*G06F 9/44* (2018.01)
*G06F 21/57* (2013.01)
*G06F 11/34* (2006.01)
*G06F 9/4401* (2018.01)

(52) U.S. Cl.
CPC .......... *G06F 21/575* (2013.01); *G06F 9/4401* (2013.01); *G06F 11/3476* (2013.01)

(58) Field of Classification Search
None
See application file for complete search history.

(56) References Cited

U.S. PATENT DOCUMENTS

| 2005/0132177 | A1 | 6/2005 | Challener et al. |
| 2012/0278655 | A1* | 11/2012 | Lin ............. G06F 11/2268 714/37 |
| 2017/0091017 | A1 | 3/2017 | Huang |
| 2017/0262352 | A1 | 9/2017 | Jeansonne et al. |
| 2018/0300202 | A1* | 10/2018 | Lambert ........... G06F 9/4405 |
| 2019/0042391 | A1* | 2/2019 | Menon ............. G06F 11/3428 |

FOREIGN PATENT DOCUMENTS

| CN | 106250725 | 12/2016 |
| TW | 201143322 | 12/2011 |
| TW | 201617870 | 5/2016 |
| TW | 201712543 | 4/2017 |

OTHER PUBLICATIONS

"Office Action of Taiwan Counterpart Application", dated Apr. 30, 2020, p. 1-p. 8.

* cited by examiner

*Primary Examiner* — Fahmida Rahman
(74) *Attorney, Agent, or Firm* — JCIPRNET

(57) ABSTRACT

A firmware security guarding method and an electronic system using the same are provided. The firmware security guarding method includes the following steps: setting at least one monitoring objective, wherein each of the at least one monitoring objective corresponds to one of at least one behavior reference file stored in a memory device of the electronic system; loading from the memory device the at least one behavior reference file corresponding to the at least one monitoring objective when booting the electronic system; and checking whether an abnormal event is included in a basic input/output system boot behavior of the electronic system according to the loaded at least one behavior reference file.

18 Claims, 3 Drawing Sheets

FIRMWARE SECURITY GUARDING METHOD AND ELECTRONIC SYSTEM USING THE SAME

CROSS-REFERENCE TO RELATED APPLICATION

This application claims the priority benefit of Taiwan application serial no. 108101443, filed on Jan. 15, 2019. The entirety of the above-mentioned patent application is hereby incorporated by reference herein and made a part of this specification.

BACKGROUND

Technical Field

The disclosure relates to a system security protection technology, and more particularly to a firmware security guarding method and an electronic system using the same.

Related Art

Basic input/output system (BIOS) is an industry standard firmware interface. The BIOS is configured to, when a computer starts up, execute a power-on self-test on various parts of a system, and load an initial program loader (IPL) or load an operating system stored in a main memory. Today, Unified Extensible Firmware Interface (UEFI) BIOS has become the mainstream of current systems due to characteristics such as greater fault tolerance, greater error correction capability and higher addressability.

A current BIOS or UEFI BIOS has many security-related technologies, for example, Boot Guard (BG), UEFI secure boot, measured boot, Trusted Platform Module (TPM) and so on. All these protection technologies are capable of preventing security problems of the BIOS or UEFI BIOS caused by malicious modification.

However, if the BIOS or UEFI BIOS has program security vulnerabilities in its firmware, attackers may take advantage of such security vulnerabilities without the need to modify the programs, and existing security-related technologies cannot protect against such situations. Therefore, how to improve firmware security is an urgent problem to be solved.

SUMMARY

Embodiments of the disclosure provide a firmware security guarding method and an electronic system using the same, capable of improving system security.

A firmware security guarding method according to an embodiment of the disclosure is adapted to an electronic system and includes the following steps. At least one monitoring objective is set, wherein each of the at least one monitoring objective corresponds to one of at least one behavior reference file stored in a memory device of the electronic system. The at least one behavior reference file corresponding to the at least one monitoring objective is loaded from the memory device when the electronic system is booted. According to the loaded at least one behavior reference file, whether a basic input/output system (BIOS) boot behavior of the electronic system includes an abnormal event is checked.

An electronic system according to an embodiment of the disclosure includes a memory device and a control device. The memory device is configured to record at least one behavior reference file. The control device is coupled to the memory device and configured to: set at least one monitoring objective, wherein each of the at least one monitoring objective corresponds to one of the at least one behavior reference file stored in the memory device of the electronic system; load from the memory device the at least one behavior reference file corresponding to the at least one monitoring objective when the electronic system boots; and check whether a BIOS boot behavior of the electronic system includes an abnormal event according to the loaded at least one behavior reference file.

To make the above features and advantages of the disclosure more comprehensible, examples accompanied with drawings are described in detail as follows.

DESCRIPTION OF THE EMBODIMENTS

Figure 1A:
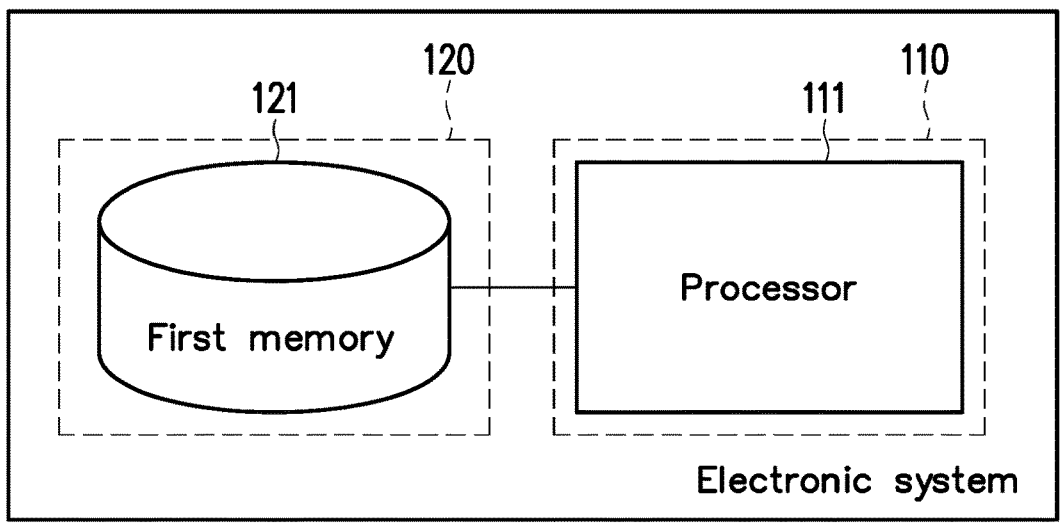
FIG. 1A illustrates a schematic diagram of an electronic system according to an embodiment of the disclosure.

Some embodiments of the disclosure will be hereinafter described in detail with reference to the accompanying drawings. In the following description, the same reference numerals in different drawings represent the same or similar elements. These embodiments are only a part of the disclosure and do not disclose all of the possible implementations of the disclosure. More specifically, these embodiments are only examples of the method and the electronic system within the scope of the claims of the disclosure.

In this specification, the term "basic input/output system (BIOS)" will be used to indicate a legacy BIOS, a Unified Extensible Firmware Interface (UEFI) BIOS, or other BIOS interface between an operating system and system firmware.

FIG. 1A illustrates a schematic diagram of an electronic system according to an embodiment of the disclosure. Referring first to FIG. 1A, an electronic system 100a includes a control device 110 and a memory device 120, wherein the control device 110 includes, for example, a processor 111, and the memory device 120 includes, for example, a first memory 121, wherein the processor 111 is coupled to the first memory 121. For example, the electronic system 100a may be a personal computer (PC), a notebook, a tablet PC, a smartphone or the like, and the disclosure is not limited thereto.

In the embodiment, the processor 111 is configured to be in charge of overall operation of the electronic system 100a, such as to execute a firmware security guarding method, and the like. The processor 111 includes, for example, a central processing unit (CPU), or other programmable general purpose or special purpose microprocessor, a digital signal processor (DSP), a programmable controller, an application specific integrated circuit (ASIC), a programmable logic device (PLD), or other similar device, or a combination of the above. However, the disclosure is not limited thereto.

In the embodiment, the first memory 121 is configured to store data such as, for example, behavior reference files required for executing the firmware security guarding method, and the like. The first memory 121 is, for example, a random access memory (RAM), a read-only memory (ROM), a flash memory, a hard disk, or other similar device, or a combination of the above. However, the disclosure is not limited thereto. In some embodiments, the first memory 121 may be a memory for storing a BIOS code, but the disclosure is not limited thereto.

It is worth mentioning that the processor 111 of the electronic system 100a may further be connected to one or more peripheral hardware devices not shown in FIG. 1A, which may be implemented by persons of ordinary skill in the art according to needs and will not be described herein.

Figure 1B:
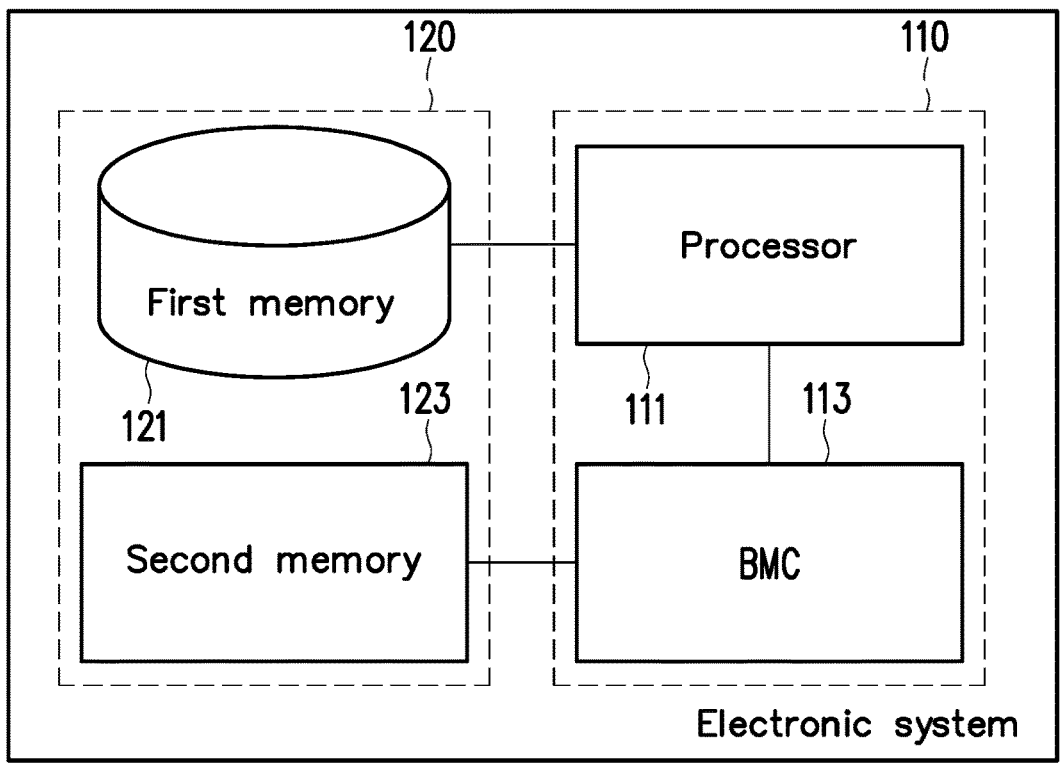
FIG. 1B illustrates a schematic diagram of an electronic system according to another embodiment of the disclosure.

FIG. 1B illustrates a schematic diagram of an electronic system according to another embodiment of the disclosure.

Referring to FIG. 1B, an electronic system 100b includes the control device 110 and the memory device 120, wherein the control device 110 includes, for example, the processor 111 and a baseboard management controller (BMC) 113, and the memory device 120 includes, for example, the first memory 121 and a second memory 123, wherein the processor 111 is coupled to the first memory 121 and the BMC 113, and the BMC 113 is coupled to the second memory 123. For example, the electronic system 100b may be a server of a data center or the like, and the disclosure is not limited thereto. The processor 111 and the first memory 121 have been described in the foregoing paragraphs, and therefore will not be described again here.

In the embodiment, the BMC 113 is configured to collect operation conditions and system states such as, for example, system voltage, temperature, fan speed and the like, of the electronic system 100b. In some embodiments, the BMC 113 may integrate many analog and digital data converters for monitoring the voltage, counters for monitoring the fan speed, pulse width modulation (PWM) for driving the fan, or analog and digital data outputs, general-purpose inputs/outputs, serial ports and buses communicating with external sensors and extended component interfaces, and so on, in the electronic system 100b. Persons of ordinary skill in the art should have a good understanding of the BMC 113 and can thus implement the BMC 113 according to needs. Therefore, more details about the BMC 113 will not be described further herein.

Particularly, in the embodiment, the BMC 113 may be configured to communicate and cooperate with the processor 111 to perform the firmware security guarding method in cooperation with the processor 111 within the capabilities of the BMC 113. In this way, the convenience of the firmware security guarding method can be greatly improved. Specific details will be described in the following paragraphs.

In the embodiment, the BMC 113 uses the second memory 123 to store data such as, for example, a system event log (SEL) generated during execution of the firmware security guarding method, and the like. The second memory 123 is, for example, a random access memory (RAM), a read-only memory (ROM), a flash memory, a hard disk, or other similar device, or a combination of the above. However, the disclosure is not limited thereto.

It is worth mentioning that the processor 111 and the BMC 113 of the electronic system 100b may each further be connected to one or more peripheral hardware devices not shown in FIG. 1B, which may be implemented by persons of ordinary skill in the art according to needs and will not be described herein.

It is worth mentioning that in the description herein, when an electronic system mentioned is not accompanied by a corresponding reference numeral, it may refer to the electronic system 100a, the electronic system 100b or other electronic system including the control device 110 and the memory device 120.

When the electronic system boots, the processor 111 loads the BIOS and executes the firmware security guarding method, so as to protect the firmware during a BIOS boot phase before entering an operating system. A UEFI BIOS boot is explained below as an example.

Figure 2:
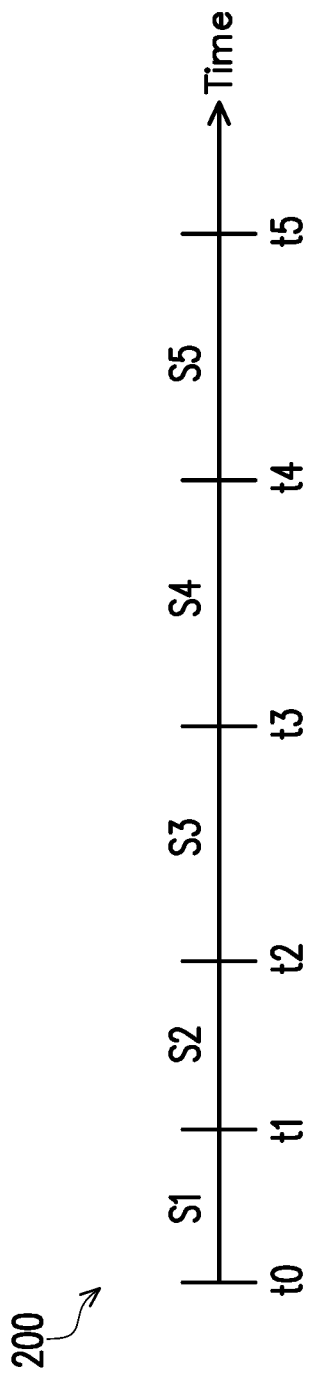
FIG. 2 illustrates a schematic diagram of a UEFI BIOS boot process according to an embodiment of the disclosure.

FIG. 2 illustrates a schematic diagram of a UEFI BIOS boot process according to an embodiment of the disclosure. Referring to FIG. 2, a UEFI BIOS boot process 200 is, for example, divided into five phases S1 to S5.

Phase S1 is a security (SEC) phase, lasting from time point t0 to time point t1. In phase S1, a main memory has not been initialized, so caches of the processor 111 are used to pre-verify the processor 111, a chipset, a motherboard and so on before the main memory is initialized.

Phase S2 is a pre-EFI initialization (PEI) phase, lasting from time point t1 to time point t2. In phase S2, initialization of the processor 111, the main memory, the chipset and the motherboard is started, and an EFI driver memory is loaded.

Phase S3 is a Driver Execution Environment (DXE) phase, lasting from time point t2 to time point t3. In phase S3, all the peripheral hardware devices (for example, PCI peripheral devices, USB peripheral devices, and SATA peripheral devices) are initialized.

Phase S4 is a Boot Device Select (BDS) phase, lasting from time point t3 to time point t4. In phase S4, the BIOS selects from which detected boot device to boot the operating system.

Phase S5 is a transient system load (TSL) phase, lasting from time point t4 to time point t5. If the BIOS chooses to enter the operating system in phase S4, the BIOS will pass control to the operating system in phase S5.

In the embodiment, the phase after time point t5 may be called an operating system phase, the period between time point t0 and time point t5 may be called the BIOS boot phase, and a boot behavior of the system during the BIOS boot phase may be called a BIOS boot behavior. The control device 110 of the electronic system executes the firmware security guarding method, and monitors the BIOS boot behavior during the BIOS boot phase between time point t0 and time point t5 to protect the firmware from the BIOS boot phase. It is to be noted that the embodiment of FIG. 2 is merely illustrative of the execution and protection timing of the firmware security guarding method, and is not intended to limit the disclosure.

Figure 3:
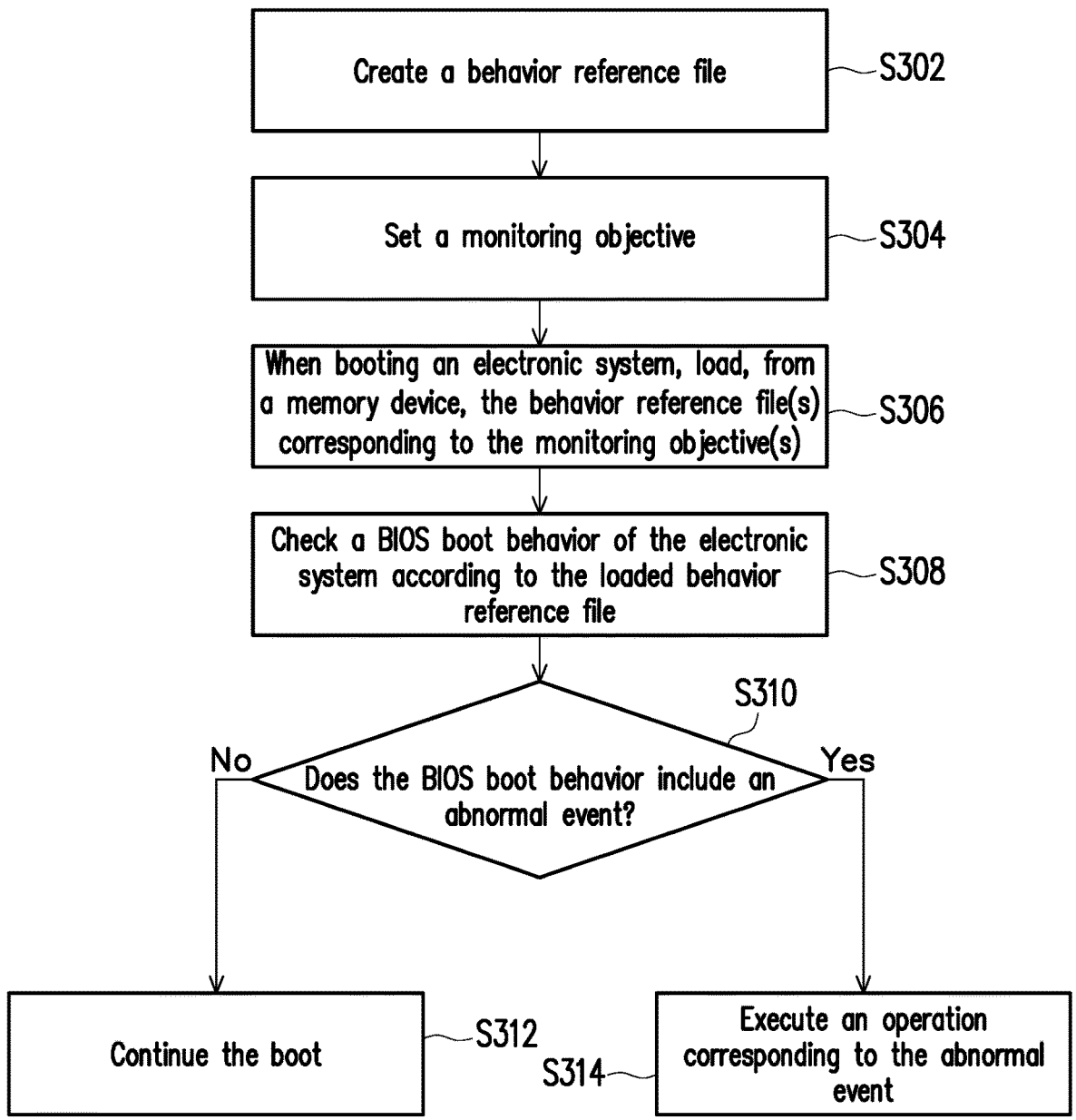
FIG. 3 illustrates a flowchart of a firmware security guarding method according to an embodiment of the disclosure.

FIG. 3 illustrates a flowchart of a firmware security guarding method according to an embodiment of the disclosure.

Referring to FIG. 3, firstly, in step S302, the control device 110 creates a behavior reference file. Specifically, the behavior reference file is a file used as a template for the BIOS boot behavior, in which a standard or an expected BIOS boot behavior, for example, is recorded. By comparing the created behavior reference file with an actual BIOS boot behavior, it is possible to find out whether an abnormality or an unexpected operation occurs in the actual BIOS boot behavior. In the embodiment, the behavior reference file is created by the processor 111 of the control device 110 and recorded in the memory device 120 after a successful boot of the electronic system. In other embodiments, the behavior reference file may be obtained by user's editing. The disclosure is not limited thereto.

In some embodiments, the behavior reference file includes, for example, a boot log file including a record of a plurality of operations in a plurality of processes in the BIOS boot phase. After a successful BIOS boot of the electronic system, the user may decide by themselves whether to make the detailed boot process of this successful BIOS boot into the boot log file in the behavior reference file, and store the completed boot log file in the first memory 121.

In some embodiments, the behavior reference file includes, for example, a hardware configuration file including a record of a plurality of hardware devices connected to the electronic system, such as the number and capacity of memories, the number and model numbers of peripheral hardware devices, and the like. After a successful BIOS boot of the electronic system, the user may decide by themselves whether to make all the hardware devices read in this successful BIOS boot into the hardware configuration file in the behavior reference file, and store the completed hardware configuration file in the first memory 121.

In some embodiments, the behavior reference file includes, for example, a setting value log file including at least one of a BIOS setting value and a UEFI non-volatile memory random access memory (NVRAM) variable. After a successful BIOS boot of the electronic system, the user may decide by themselves whether to make at least one of the BIOS setting value and the UEFI NVRAM variable in this successful BIOS boot into the setting value log file in the behavior reference file, and store the completed setting value log file in the first memory 121.

In step S304, the control device 110 sets a monitoring objective. Specifically, the monitoring objective can be set according to needs, and the disclosure does not specifically limit the number and content of the set monitoring objective. For example, in some electronic systems where hardware often changes (for example, where there are frequent needs to plug-in/unplug USB devices or the like), it can be set not to monitor the hardware configuration. Conversely, if the hardware of the electronic system seldom or rarely changes, it can be set to monitor the hardware configuration.

In the embodiment, examples of the monitoring objective include BIOS boot process, BIOS boot time, hardware configuration change (addition, removal or modification of hardware), BIOS setting value, UEFI NVRAM variable and so on. However, the disclosure is not limited thereto. Particularly, each monitoring objective corresponds to one behavior reference file. For example, the BIOS boot process and the BIOS boot time both correspond to the boot log file; the hardware configuration change corresponds to the hardware configuration file; the BIOS setting value and the UEFI NVRAM variable correspond to, for example, the setting value log file in the behavior reference file.

In some embodiments, the user may, for example, give a setting command to the processor 111 of the control device 110 through a BIOS setting interface, so as to set the monitoring objective and the corresponding behavior reference file through the processor 111.

In some embodiments, the user may, for example, give a command through an Intelligent Platform Management Interface (IPMI), or use a Redfish Application Programming Interface (API) to set the monitoring objective and the corresponding behavior reference file through the BMC 113. Accordingly, the monitoring objective can also be set through the BMC 113 when the electronic system 100b is off.

In some embodiments, while setting the monitoring objective, the control device 110 also sets an operation corresponding to occurrence of an abnormal event in the monitoring objective.

In step S306, when the electronic system boots, the control device 110 loads, from the memory device 120, the behavior reference file corresponding to the monitoring objective set in step S304.

In some embodiments, the monitoring objective is set through the processor 111. When the electronic system boots, the processor 111 of the control device 110 loads the behavior reference file corresponding to the set monitoring objective from the first memory 121.

In some embodiments, the monitoring objective is set through the BMC 113. When the electronic system 100b boots, the processor 111 communicates with the BMC 113, so that the processor 111 can load the behavior reference file corresponding to the set monitoring objective from the first memory 121.

In step S308, the control device 110 checks the BIOS boot behavior of the electronic system according to the loaded behavior reference file; in step S310, the control device 110 determines whether the BIOS boot behavior includes an abnormal event. Specifically, according to the set monitoring objective, the control device 110 compares this BIOS boot behavior with the loaded behavior reference file to determine whether this BIOS boot behavior matches the record in the behavior reference file. If this BIOS boot behavior does not match the behavior reference file, it means that this BIOS boot behavior includes an abnormal event; otherwise, it means that this BIOS boot behavior does not include an abnormal event.

In some embodiments, the set monitoring objective includes the BIOS boot process and the BIOS boot time. The control device 110, for example, compares the BIOS boot process and the BIOS boot time of this BIOS boot with the record in the boot log file, so as to determine whether the BIOS boot process has changed or whether the BIOS boot time is normal (for example, whether a time difference from the BIOS boot time recorded in the boot log file is not greater than a preset threshold). If the BIOS boot process has changed or the BIOS boot time is abnormal, it means that this BIOS boot behavior includes an abnormal event.

In some embodiments, the set monitoring objective includes the hardware configuration change. The control device 110, for example, compares the hardware read during this BIOS boot with the hardware configuration file, so as to determine whether the hardware read during this BIOS boot matches the hardware configuration file (for example, whether there is an addition, removal or modification of hardware). If the hardware read during this BIOS boot does not match the hardware configuration file, it means that this BIOS boot behavior includes an abnormal event.

In some embodiments, the set monitoring objective includes the BIOS setting value and the UEFI NVRAM variable. The control device 110, for example, compares the BIOS setting value and the UEFI NVRAM variable used in this BIOS boot with the record in the setting value log file, so as to determine whether the BIOS setting value and the UEFI NVRAM variable have changed. If the BIOS setting value or the UEFI NVRAM variable has changed, it means that this BIOS boot behavior includes an abnormal event.

In some examples, all of the above comparisons are performed by the processor 111. However, in some examples, after the processor 111 communicates with the BMC 113, some of the comparisons (for example, comparison of the peripheral hardware devices, or comparison of some of the setting values) may be performed by the BMC 113 in cooperation with the processor 111.

If the control device 110 determines in step S310 that this BIOS boot behavior does not include an abnormal event, the process proceeds to step S312 to continue the boot. For example, control may be given to the operating system to continue to enter the operating system phase.

If the control device 110 determines in step S310 that this BIOS boot behavior includes an abnormal event, the process proceeds to step S314, in which the control device 110 executes an operation corresponding to the abnormal event, for example, stopping the boot, producing an alarm sound, or notifying an administrator of the electronic system through a short message or an email, and the like.

In some embodiments, as long as the control device 110 determines that an abnormality occurs in the BIOS boot behavior, the abnormal event is recorded in the second memory 123 of the BMC 113. The above abnormal event is, for example, recorded as a system event log file, but the disclosure is not limited thereto.

In this way, even if a hacker carries out an attack, such as skipping a specific boot step or modifying a specific setting value or parameter or the like, through a program vulnerability of the BIOS itself, the attack can be detected by the control device 110.

In summary, in the firmware security guarding method and the electronic system using the same as proposed in the embodiments of the disclosure, by checking the BIOS boot behavior using the behavior reference file previously created and recorded in a memory, firmware protection can be improved so that the protection begins as soon as a boot begins. Moreover, an unexpected BIOS boot behavior can be detected in the BIOS boot phase such that the security of the electronic system can be improved.

Although the disclosure has been described with reference to the above examples, it will be apparent to one of ordinary skill in the art that modifications to the described examples may be made without departing from the spirit of the disclosure. Accordingly, the scope of the disclosure will be defined by the attached claims and not by the above detailed descriptions.

What is claimed is:

1. A firmware security guarding method applicable to an electronic system, wherein the electronic system includes a processor, a first memory coupled to the processor and a baseboard management controller, the firmware security guarding method comprises:
    setting, by the baseboard management controller, at least one monitoring objective, wherein each of the at least one monitoring objective corresponds to one of at least one behavior reference file stored in the first memory of the electronic system, wherein the monitoring objective comprises UEFI NVRAM variable;
    communicating, by the processor, with the baseboard management controller during booting the electronic system, so that the processor loads the at least one behavior reference file from the first memory;
    according to the at least one behavior reference file corresponding to the at least one monitoring objective, checking during booting of the electronic system, by the processor in cooperation with the baseboard management controller, whether a basic input/output system (BIOS) boot behavior of the electronic system comprises an abnormal event by determining whether the UEFI NVRAM variable have changed during booting, wherein an abnormality occurs is determined based on the change of the UEFI NVRAM variable during the booting, the electronic system further comprises a second memory coupled to the baseboard management controller;
    recording, by the baseboard management controller, the abnormal event in the second memory in response to determining that the abnormal event occurs in the BIOS boot behavior; and
    executing, by the processor, an operation corresponding to the abnormal event.

2. The firmware security guarding method according to claim 1, further comprising, before setting the at least one monitoring objective:
    creating the at least one behavior reference file according to a successful BIOS boot behavior of the electronic system after the electronic system is successfully booted; and
    writing the created at least one behavior reference file to the first memory.

3. The firmware security guarding method according to claim 1, wherein the at least one behavior reference file is used as a template for the BIOS boot behavior.

4. The firmware security guarding method according to claim 1, wherein the monitoring objective further comprises at least one of BIOS boot process, BIOS boot time, hardware configuration change, and BIOS setting value.

5. The firmware security guarding method according to claim 1, wherein the at least one behavior reference file comprises a boot log file.

6. The firmware security guarding method according to claim 5, wherein the step of checking, by the processor in cooperation with the baseboard management controller, whether the BIOS boot behavior of the electronic system comprises the abnormal event according to the at least one behavior reference file corresponding to the at least one monitoring objective comprises:
    determining whether a BIOS boot process of the BIOS boot behavior has changed according to the boot log file.

7. The firmware security guarding method according to claim 5, wherein the step of checking, by the processor in cooperation with the baseboard management controller, whether the BIOS boot behavior of the electronic system comprises the abnormal event according to the at least one behavior reference file corresponding to the at least one monitoring objective comprises:
    determining whether a boot time of the BIOS boot behavior is normal according to the boot log file.

8. The firmware security guarding method according to claim 1, wherein the at least one behavior reference file comprises a hardware configuration file, and wherein the step of checking, by the processor in cooperation with the baseboard management controller, whether the BIOS boot behavior of the electronic system comprises the abnormal event according to the at least one behavior reference file corresponding to the at least one monitoring objective comprises:
    determining whether the BIOS boot behavior comprises a hardware configuration change according to the hardware configuration file.

9. The firmware security guarding method according to claim 1, wherein the operation comprises at least one of stopping the boot, producing an alarm sound, creating a log file corresponding to the abnormal event, and notifying an administrator of the electronic system.

10. An electronic system comprising:
    a first memory configured to record at least one behavior reference file;
    a processor coupled to the first memory; and
    a baseboard management controller coupled to the processor and configured to:
    set at least one monitoring objective, wherein each of the at least one monitoring objective corresponds to one of the at least one behavior reference file, wherein the monitoring objective comprises UEFI NVRAM variable;

wherein the processor is configured to communicate with the baseboard management controller, the processor is configured to:

load the at least one behavior reference file from the first memory when the electronic system boots;

according to the at least one behavior reference file corresponding to the at least one monitoring objective, check during booting of the electronic system, in cooperation with the baseboard management controller, whether a basic input/output system (BIOS) boot behavior of the electronic system comprises an abnormal event by determining whether the UEFI NVRAM variable have changed during booting, wherein an abnormality occurs is determined based on the change of the UEFI NVRAM variable during the booting, the electronic system further comprises a second memory coupled to the baseboard management controller; and the baseboard management controller is configured to record the abnormal event in the second memory in response to determining that the abnormal event occurs in the BIOS boot behavior, and the processor is configured to execute an operation corresponding to the abnormal event.

11. The electronic system according to claim 10, wherein the processor is further configured to, before setting the at least one monitoring objective:

create the at least one behavior reference file according to a successful BIOS boot behavior of the electronic system after the electronic system is successfully booted; and write the created at least one behavior reference file to the first memory.

12. The electronic system according to claim 11, wherein the at least one behavior reference file is used as a template for the BIOS boot behavior.

13. The electronic system according to claim 11, wherein the monitoring objective further comprises at least one of BIOS boot process, BIOS boot time, hardware configuration change, and BIOS setting value.

14. The electronic system according to claim 10, wherein the at least one behavior reference file comprises a boot log file.

15. The electronic system according to claim 14, wherein in checking whether the BIOS boot behavior of the electronic system comprises the abnormal event according to the at least one behavior reference file corresponding to the at least one monitoring objective, the processor in cooperation with the baseboard management controller is configured to determine whether a BIOS boot process of the BIOS boot behavior has changed according to the boot log file.

16. The electronic system according to claim 14, wherein in checking whether the BIOS boot behavior of the electronic system comprises the abnormal event according to the at least one behavior reference file corresponding to the at least one monitoring objective, the processor in cooperation with the baseboard management controller is configured to determine whether a boot time of the BIOS boot behavior is normal according to the boot log file.

17. The electronic system according to claim 10, wherein the at least one behavior reference file comprises a hardware configuration file, and wherein in checking whether the BIOS boot behavior of the electronic system comprises the abnormal event according to the at least one behavior reference file corresponding to the at least one monitoring objective, the processor in cooperation with the baseboard management controller is configured to determine whether the BIOS boot behavior comprises a hardware configuration change according to the hardware configuration file.

18. The electronic system according to claim 10, wherein the operation comprises at least one of stopping the boot, producing an alarm sound, creating a log file corresponding to the abnormal event, and notifying an administrator of the electronic system.

* * * * *